United States Patent [19]

Mercer

[11] 3,989,434

[45] Nov. 2, 1976

[54] BLENDING AND MOLDING MEANS

[75] Inventor: James R. Mercer, Akron, Ohio

[73] Assignee: McDowell-Wellman Engineering Company, Cleveland, Ohio

[22] Filed: Oct. 29, 1975

[21] Appl. No.: 626,841

[52] U.S. Cl. ............................. 425/207; 259/4 AB; 259/194; 425/242 R
[51] Int. Cl.² ....................... B29F 3/02; B01F 5/06
[58] Field of Search ............ 259/4 AB, 95, 97, 194, 259/195; 425/207, 208, 242 R; 138/42, 43; 48/180 M, 180 B; 239/432

[56] References Cited
UNITED STATES PATENTS

| | | | |
|---|---|---|---|
| 2,669,750 | 2/1954 | Keeney | 259/191 |
| 3,130,448 | 4/1964 | Tomlinson | 425/208 X |

*Primary Examiner*—Edward L. Roberts
*Assistant Examiner*—Alan Cantor
*Attorney, Agent, or Firm*—McNenny, Pearne, Gordon, Gail, Dickinson & Schiller

[57] ABSTRACT

Mixing means in the form of a torpedo for an injection molding machine having a plurality of alternately isolated and intersecting flow paths for repeatedly dividing and recombining material flow streams to achieve uniform properties throughout the material. The paths are formed as right and left-hand helical channels on the circumference of the torpedo body, with the helixes of one hand having a pitch different from that of the other such that the flow paths intersect in a pattern which is bilaterally asymmetrical with respect to an axial net flow direction. The nonsymmetrical arrangement is formed to provide substantially greater mixing action than that obtainable with similar symmetrical arrangements.

11 Claims, 5 Drawing Figures

U.S. Patent    Nov. 2, 1976    3,989,434
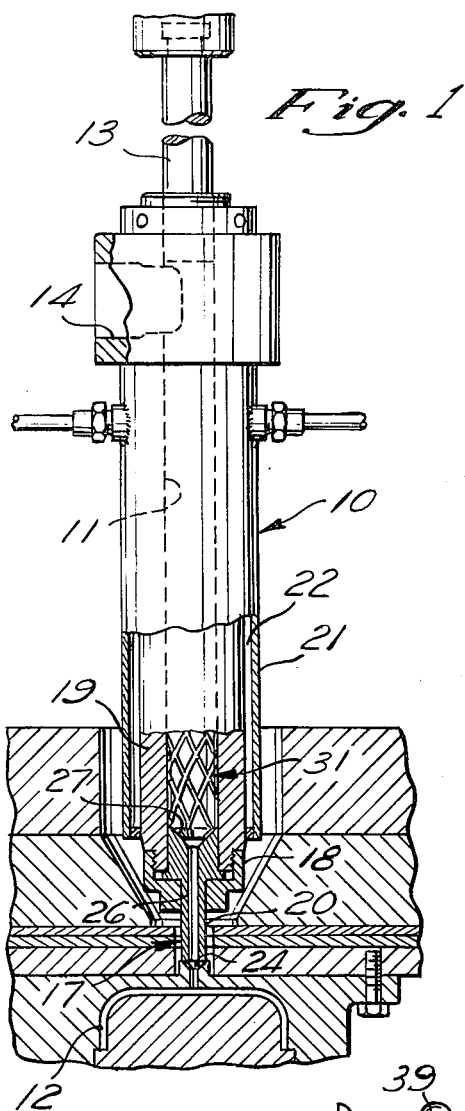
Fig. 1
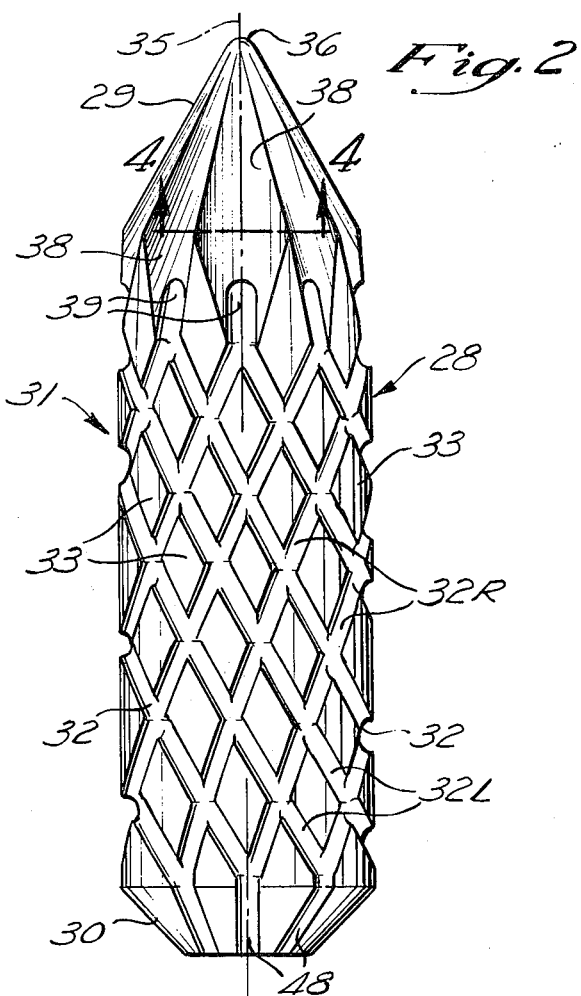
Fig. 2
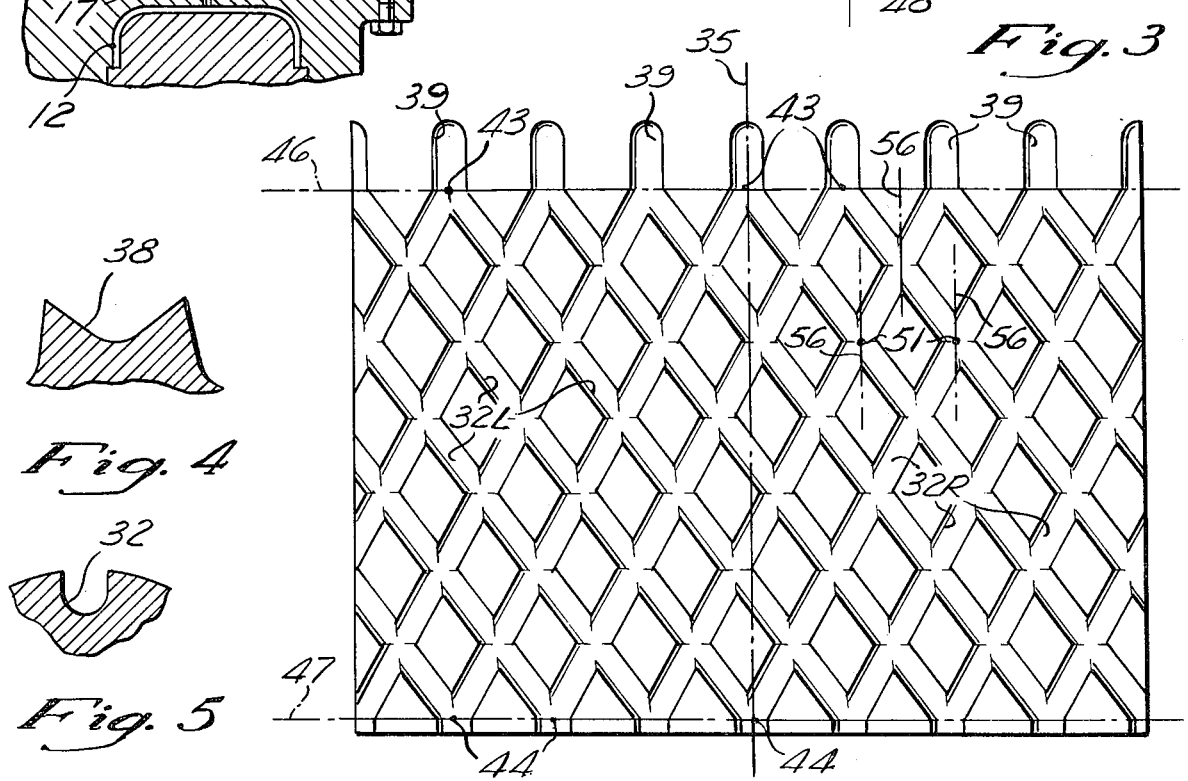
Fig. 3
Fig. 4
Fig. 5

3,989,434

BLENDING AND MOLDING MEANS

BACKGROUND OF THE INVENTION

The invention relates to material mixing means and, more specifically, to mixing means of the type in which a plurality of material flow streams are continuously divided and recombined.

PRIOR ART

Material mixing devices of the type to which the present invention is directed have among their various uses application in injection molding machines. In injection molding machines, particularly of the ram-feed type where the inherent agitating action of a screw feed is not present, an undersized plug, called a "torpedo" in the trade, has been utilized in the ram cylinder or other flow passage leading to the mold cavity. This plug or torpedo has been employed to increase the working of the material being molded by restricting the area of the flow passage through which it must pass. It is also known to provide various external channels and contours on such plugs to obtain flow and mixing charactertistics for improved homogenization of the material. Examples of the prior art are illustrated in U.S. Pat. Nos. 2,669,750; 3,130,448; and 3,593,375. The teaching of the former two of these patents is that exterior channels following left and right-hand helixes are to be substantially symmetrical in both directions such that the pitch and other characteristics of the channels of opposite hands are the same.

SUMMARY OF THE INVENTION

The invention provides means for homogenizing flowable material, such as thermoplastic or thermosetting, moldable material, wherein material flow is directed through a plurality of intersecting paths which are bilaterally asymmetrical to a net flow direction. It has been discovered that an asymmetrical pattern of intersecting flow paths produces greatly improved material mixing action when compared to similar symmetrical arrangements.

In the preferred embodiment, the intersecting flow paths are provided as open channels helically oriented on the exterior of a circular plug. The plug is adapted to be disposed in the path of material to the mold of an injection molding machine. The axis of the plug defines the net flow direction of material over the plug. The channels cooperate with a surface of a bore in which the plug is received to form a plurality of paths in both right and left-hand helixes, which are alternately isolated and intersecting. The intersecting paths are arranged in asymmetrical relationship to a line on the surface of the plug parallel to its axis and the net flow direction by virtue of the left and right-hand helixes having different pitches. As illustrated, the paths of each helix direction are formed as equally spaced, multiple helixes, with the pitches of both directions being selected such that pairs of opposite hand paths intersect at common points at an entrance stage and at common points at an exit stage. Preferably, the helix pattern of both directions are also arranged such that the intersecting points at the inlet and outlet stages are in axial alignment with one another.

BRIEF DESCRIPTION OF THE DRAWING

FIG. 1 is an elevational view of a ram cylinder of an injection molding machine with portions thereof in cross section to reveal a material mixing plug constructed in accordance with the principles of the invention;

FIG. 2 is an enlarged, elevational view of the mixing plug of the invention;

FIG. 3 is a planar development of the circumference of the plug of FIG. 2;

FIG. 4 is a fragmentary, cross sectional view of a lead end of the plug, taken along the line 4—4 of FIG. 2; and FIG. 5 is a fragmentary, cross sectional view of a portion of the plug illustrating the profile of an external groove.

DESCRIPTION OF THE PREFERRED EMBODIMENT

A conventional ram cylinder, indicated generally at 10, of an injection molding machine forms in its inner bore a charging chamber 11 through which flowable material is forcibly driven into a mold cavity 12 by operation of a cylindrical ram 13. Thermoplastic or thermosetting, moldable material is delivered to the zone of the charging chamber 11 through an inlet or supply 14 by conventional means (not shown). The illustrated ram cylinder is conventional in construction, and is of the general type illustrated in U.S. Pat. No. 3,194,868 to Shaw. During the molding cycle, the ram 13 reciprocates axially to forcibly induce flow of the molding material through the chamber 11 and through a nozzle assembly 17.

The nozzle assembly 17 includes an end cap 18 which is removably threaded onto a lower end, as viewed in FIG. 1, of a cylindrical, tubular body 19, forming the charging chamber 11. The end cap 18 retains a nozzle body 20 on the lower end of the cylinder 19. A jacket 21 encircles the cylinder 19 to form a closed chamber 22 in which water or other fluid may be circulated to control the temperature of the cylinder 19, and therefore the temperature of the molding material in the charging chamber 11. In a usual manner, a lower end of the nozzle body 20 is provided with a spherical surface to facilitate sealing engagement with an aligned recess 24 of the gate of the mold. The nozzle body 20 includes an axially extending, central, through passage or bore 26 having at its upper end a flared throat or entrance 27 which, in the illustrated case, is conical and forms a 90° angle.

Means for intensely mixing and homogenizing material flowing through the charging chamber 11 is provided in the form of a circularly shaped plug 31. The plug 31 includes a tapered or conical forward portion 29, a generally cylindrical, intermediate main body portion 28, and a trailing, truncated, conical portion 30. With reference to FIG. 2, the plug 31 preferably is a solid body having its cylindrical exterior surface formed with a plurality of grooves 32, leaving intervening land portions 33. The upper or lead end 29 of the plug is tapered from the full diameter of the plug 31 to a somewhat blunted or rounded point 36. A series of flutes 38 are angularly disposed about the plug end 29 flaring radially and circumferentially outwardly in a forward-flow direction, i.e., downwardly in FIG. 2. The flutes 38 are centered on and in communication with associated inlet grooves 39 on the cylindrical portion 28 of the plug.

The grooves are disposed in multiple right and left-hand helix patterns, designated 32R and 32L, respectively. In the illustrated embodiment, there are an equal number of leads or grooves, namely eight, in both the right and left-hand directions. As illustrated in FIG. 5, the grooves 32 are milled or otherwise formed on the circumference of the cylindrical plug portion 28 and are rounded at their interiors to facilitate material flow therethrough and cleaning of the plug between periods of use. Preferably, the plug 31 is machined from tool steel and is heat-treated subsequent to machining operations to a hardness of 50–55 on the Rockwell C scale. The external surfaces of the plug ideally are polished to improve material flow characteristics and fatigue resistance.

The grooves of each hand 32R and 32L are parallel and equally spaced from each other on the periphery of the cylindrical portion 28, and are disposed thereon such that right and left-hand grooves 32R and 32L intersect at common points 43 and 44 on imaginary stage lines 46 and 47 lying in planes transverse to the axis 35 of the plug. The relatively short inlet grooves or passages 39 extend axially from the intersecting points 43 of the grooves 32 at the upper stage line 46. Similarly, a set of axially extending grooves 48 on the trailing end portion 30 of the plug 31 communicate with the grooves 32 at points 44 of their intersection on the stage line 47 to provide an exit for material.

As seen most clearly in FIG. 3, where the grooves 32 shown in a planar development are straight, the helix angle or pitch of the right-hand grooves is somewhat steeper than that of the left-hand grooves 32L. The grooves 32R and 32L intersect at a plurality of points 51 on the area of the cylindrical plug portion 28. Owing to the unequal pitches of the right and left-hand grooves 32R and 32L at each of these intersections 51, the grooves are bilaterally asymmetrical with a corresponding reference line 56 drawn in a direction parallel to the axis 35 of the plug 31. Preferably, the grooves 32 are arranged such that their intersections 43, 44 at the stage lines 46, 47 and the corresponding inlet and outlet grooves 39 and 48 are angularly aligned, i.e., lie on common lines parallel to the axis 35 of the plug. Further, an inspection of FIG. 3 reveals that the difference in pitch of the grooves is such that the steeper right-hand pitch results in an angular course of the right-hand grooves 32R about the circumference of the cylindrical portion 28 of three leads or intersecting points 43 from one end to the other, while the less steep left-hand pitch results in an angular course of the left-hand grooves 32L of four leads or intersecting points.

By way of illustration, a plug constructed in accordance with the invention has the following physical characteristics:

| | |
|---|---|
| Diameter | 2.5 in. |
| Length between stage lines | 5-3/8 in. |
| Width of grooves | 5/16 in. |
| Depth of grooves | 5/16 in. |
| Right-hand pitch | 14.333 in. (8 leads) |
| Left-hand pitch | 10.75 in. (8 leads). |

The outside diameter of the plug 31 is selected with respect to the diameter of the charging chamber 11 to provide a relatively close fit so that the bore of the chamber effectively closes the grooves 32 and prevents communication between the grooves across the lands 33. The plug 31 is axially supported by abutment with the conical nozzle surface 27. Material within the charging chamber 11 is forcibly driven forwardly or downwardly as viewed in FIG. 1, and is directed over the fluted end 20 of the plug. The material is thereby separated into a plurality of flow streams, at the inlet grooves 39, in the illustrated embodiment, eight in number. At the forward stage line 46, the eight flow streams are divided into the left and right-hand grooves 32 to double the number of flow streams. Thereafter, as material flows through the paths defined by the grooves 32 and bore of the chamber 11, it is successively recombined and redivided at each intersection of the right and left-hand grooves. The reasons for the greatly improved mixing action of the nonsymmetric arrangement of the grooves are not fully understood. The result may be produced because the grooves of the lower pitch are proportionately longer than the leads of the higher pitch, so that the net resistance along these grooves is slightly higher than that of the other, and at each intersection the forces and velocities to the left and right are unequal. Either or both of these factors may produce a degree of turbulence or mixing action in the immediate vicinity of the intersections 51 not obtainable with more symmetrical groove arrangements. The improved mixing or blending action is of great advantage in injection molding machines, particularly of the ram-feed type disclosed, for working, unifying, and homogenizing typical molding materials. It is especially useful for mixing naturally colored material and color additives into a product of consistently uniform color. It is contemplated, for example, that the grooves may be suitably arranged in a planar path with a pattern corresponding to that of FIG. 3.

Although preferred embodiments of this invention are illustrated, it is to be understood that various modifications and rearrangements of parts may be resorted to without departing from the scope of the invention disclosed and claimed herein.

What is claimed is:

1. A device for mixing flowable material comprising an inlet zone, a plurality of separate inlet passages in said inlet zone adapted to receive material from a single chamber, an outlet zone, a plurality of separate outlet passages at said outlet zone adapted to distribute material into a common chamber, means defining a plurality of flow paths between said inlet and outlet passages, each of said flow paths along its length being alternately isolated from adjacent flow paths and then intersecting with an adjacent flow path, said paths intersecting along lines that are bilaterally asymmetrical to a net flow direction between said inlet and outlet zones.

2. A device as set forth in claim 1, wherein said paths are formed by open-faced grooves on a first body and a surface of a second body in close relationship with said first body.

3. A device as set forth in claim 2, wherein said paths follow lines which are straight when said paths are considered to lie in a plane.

4. A torpedo for mixing flowable material in a circular chamber of an injection molding machine discharging material to a mold, said torpedo being an elongated body having a generally circular cross section and an outer surface adapted to fit sufficiently close to the surface of said circular chamber to prevent material flow over said outer circular surface, said outer circular surface being interrupted by a plurality of grooves extending in a direction having a longitudinal component, inlet means on said torpedo body for directing material into said grooves, and outlet means on said body for allowing material to pass out of said grooves, the longitudinal axis of said body defining a net flow direction, each of said grooves along their lengths being alternately isolated from other grooves and intersecting other grooves, said grooves intersecting one another in a pattern which is bilaterally asymmetrical to said net flow direction.

5. A torpedo as set forth in claim 4 wherein said grooves are disposed in parallel right-hand and parallel left-hand helixes, the pitch of the right-hand helixes being different from that of the left-hand helixes.

6. A torpedo as set forth in claim 5, wherein said right-hand helixes are equally spaced about the periphery of said circular body and said left-hand helixes are similarly spaced about the periphery of said body.

7. A torpedo as set forth in claim 6, wherein the number of said right-hand helixes is equal to the number of left-hand helixes, each of said right-hand helix grooves intersecting with a left-hand helix at a point on said inlet means, each of said right-hand helix grooves intersecting with a left-hand helix groove at a point on said outlet means.

8. A torpedo as set forth in claim 7, wherein the grooves of one hand intersect the grooves of the other hand at circumferentially spaced points on the outlet means angularly shifted a number of units from circumferentially spaced points on the inlet means from which said grooves of the one hand originate, the grooves of the other hand intersecting the grooves of the one hand at circumferentially spaced points on the outlet means angularly shifted a number of units from circumferentially spaced points on the inlet means from which said grooves of the other hand originate equal to the first-mentioned number of units increased by one.

9. In combination, an injection molding machine including a circular chamber for containing molding material, means for forcibly driving molding material from the chamber into a mold, a torpedo disposed within said circular chamber between said molding material driving means and an outlet of the chamber, said torpedo having a circular cross section substantially equal in size to the circular chamber, abutment means in said chamber for axially supporting said torpedo in said chamber, said torpedo having a tapered forward end to deflect rearwardly moving molding material radially outwardly, a plurality of open-faced helical grooves on the exterior of the body of said torpedo, said grooves being provided in both left-hand and right-hand helixes, said right and left-hand helical grooves being equal in number, the grooves of each hand being parallel and equally spaced about the circumference of said body, pairs of right-hand and left-hand grooves intersecting at an inlet zone and pairs of right-hand and left-hand grooves intersecting at an outlet zone, said right and left-hand grooves alternately being isolated from other grooves and intersecting other grooves along their lengths, said right-hand grooves having a pitch different from the pitch of said left-hand grooves.

10. A torpedo for mixing flowable material in a circular chamber of an injection molding machine discharging material to a mold, said torpedo being an elongated body having a generally circular cross section and an outer surface adapted to fit sufficiently close to the surface of said circular chamber to prevent material flow over said outer circular surface, said outer circular surface being interrupted by a plurality of grooves extending in a direction having a longitudinal component, inlet means on said torpedo body for directing material into said grooves, and outlet means on said body for allowing material to pass out of said grooves, the longitudinal axis of said body defining a net flow direction, each of said grooves along their lengths being alternately isolated from other grooves and intersecting other grooves, said grooves being disposed in right-hand and left-hand helixes, said right-hand helixes being equally spaced about the periphery of said circular body and said left-hand helixes also being equally spaced about the periphery of said body, the number of said right-hand helixes being equal to the number of left-hand helixes, each of said right-hand helix grooves intersecting with a left-hand helix at a point on said inlet means, each of said right-hand helix grooves intersecting with a left-hand helix groove at a point on said outlet means, the grooves of one hand intersecting the grooves of the other hand at circumferentially spaced points on the outlet means angularly shifted a number of units from circumferentially spaced points on the inlet means from which said grooves of the one hand originate, the grooves of the other hand intersecting the grooves of the one hand at circumferentially spaced points on the outlet means angularly shifted a number of units from circumferentially spaced points on the inlet means from which said grooves of the other hand originate equal to the first-mentioned number of units increased by at least one.

11. A torpedo as set forth in claim 10, said grooves of the other hand intersecting the grooves of the one hand at circumferentially spaced points on the outlet means angularly shifted a number of units from circumferentially spaced points on the inlet means from which said grooves of the other hand originate equal to the first-mentioned number of units increased by exactly one.

* * * * *